July 12, 1927.
A. J. MICHELIN
VEHICLE WHEEL
Filed April 16, 1920
1,635,895
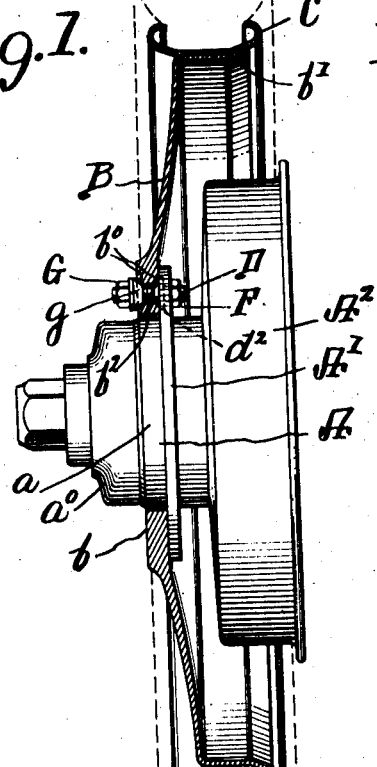
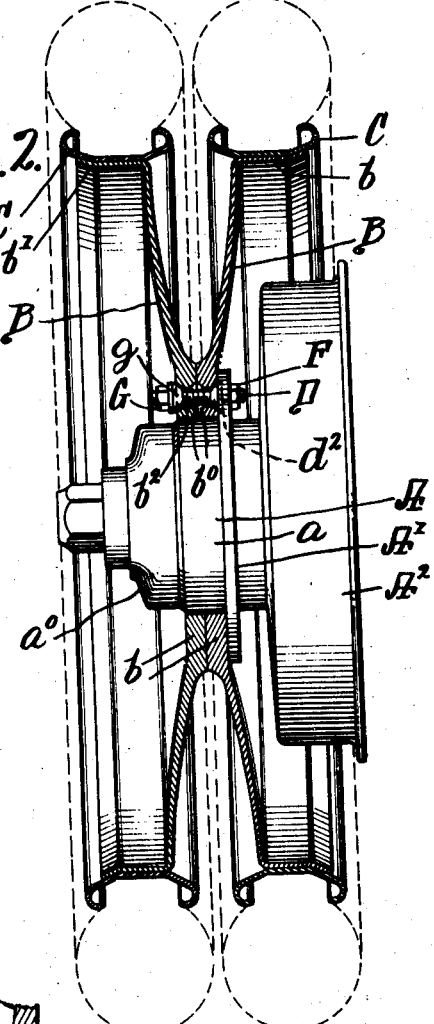
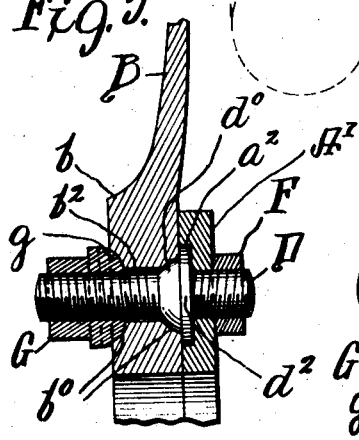
Inventor:
A. J. Michelin.
by Wilkinson & Giusta
Attorneys.

Patented July 12, 1927.

1,635,895

UNITED STATES PATENT OFFICE.

ANDRÉ JULES MICHELIN, OF PARIS, FRANCE.

VEHICLE WHEEL.

Application filed April 16, 1920, Serial No. 374,506, and in Great Britain May 20, 1926.

My present invention relates to improvements in vehicle wheels, and more especially to vehicle wheels for use with pneumatic, rubber, or other resilient tires, such as are used on automobiles, auto trucks, and the like.

The invention consists primarily in providing a detachable annular web plate carrying on its outer periphery a rim adapted to receive a tire, and provided on its inner periphery with an annular reinforced portion which is adapted to slip freely over the hub of the wheel; in combination with means for quickly and securely attaching the web plate to the hub, or for quickly releasing the same from the hub when desired.

The combination of such web plate and of such securing means will be hereinafter more fully illustrated and described.

My present invention more particularly relates to improvements on the construction shown in my application executed of even date herewith, and entitled Improvements in vehicle wheels, Case "A."

My present invention relates more especially to the improved construction of the web plate hereinafter described, and the application thereto of a separate rim made separate from and securely attached to the web plate before the two are fitted to receive a tire; also in certain improvements in the attaching and detaching means which may be quickly operated, and which will securely hold the automobile wheel in place on the hub, all as will be hereinafter described.

My invention will be more fully understood after reference to the accompanying drawings, in which like parts are indicated by similar reference symbols throughout the several views, and in which—

Figure 1 shows the hub of a wheel, with the fastening means in elevation, and with the web plate and rim in section, and the tire shown in dotted lines.

Figure 2 is a similar view to Figure 1, but shows a pair of web plates and tires mounted on the same hub.

Figure 3 is a detail showing on a larger scale the fastening means shown in Figure 1; and Figure 4 is a detail showing on a larger scale the fastening means shown in Figure 2.

A represents the hub of a wheel which is preferably of the usual form, and is provided with a flange or collar A' to which the web plate B is connected. This hub is shown as provided with the usual brake drum $A^2$, but this is not a part of the invention, and any convenient form of hub provided with a suitable flange or collar may be used in connection with the invention which relates more particularly to the removable wheel.

The web plate B is reinforced near its center, as at $b$, to form an annular bearing ring for the fastening bolts, and its outer periphery is flanged, as at $b'$, to form a seat for the metal rim C, provided to hold the tire. This rim is shown as of the clincher type, but may be of any suitable or preferred type, and it is attached to the flange $b'$ in any convenient way, as by soldering, welding, riveting, or the like.

The web plate B is preferably made substantially in the form of a frustum of a cone, whose angle is nearly 180°, but the elements of the cone are preferably not true straight lines, the angle of the cone being slightly greater near the apex than towards the base. This shape not only provides a certain amount of elasticity to the wheel, which would be lacking if the web plate were at right angles to the axis of the hub; but it also permits the wheel to be so arranged that the plane comprising the axis of the tire may be thrown either outside or inside, relative to the body of the vehicle, of that portion of the web plate attached to the hub.

This arrangement not only permits a single wheel to be mounted further out or closer to the body of the vehicle, as may be desired, but it has special advantages where it is desired to mount the removable wheels in pairs on the same hub, as shown in Figure 2.

The web plate B is preferably tapered, that is to say it decreases in thickness from its central portion to its periphery. This is clearly shown in Figs. 1 and 2 of the drawing.

The advantages gained by this reduced metal construction towards the periphery are not only greater elasticity, as already described, but the maximum resistance to loads with a minimum weight. Also by having the parts of the periphery of the wheel lighter, there is a notable advantage in decreasing the gyroscopic action of the wheel due to the decrease in weight of the metal at the periphery, where the lineal speed is, of course, greater than near the hub.

In order to conveniently assemble the wheel on the hub, or to remove the same therefrom, the hub is preferably provided with an annular shoulder or shelf $a^0$ of slightly smaller diameter than the periphery $a$ of the hub proper; and moreover the center opening $b$ in the web plate should be slightly larger than the maximum diameter of the periphery $a$ of the hub proper so that the wheel may be slipped freely on and off; the clearance for this purpose being quite appreciable and allowing play of the web plate on the hub.

In order to prevent rattling, and to form a snug and firm joint, the bearing on the web plate for the bolts is provided with concave sockets, preferably in the form of zones of spheres to engage corresponding bosses on the fastening bolts and nuts, as shown in Figures 3 and 4. Moreover the screw-threads on the opposite ends of the fastening bolts should be oppositely disposed, as shown, so that when the fastening nuts are screwed down tight any tendency of one nut to shake loose will cause the opposite nut to tighten on the screw, and thus both nuts will be automatically held tight in place. Moreover, the bolts and nuts should be so arranged that the nuts of a right-hand wheel should have right-hand threads, and the nuts of a left-hand wheel should have left-hand threads, whereby these nuts would tend automatically to set up tighter.

The fastening means hereinbefore referred to is shown in detail in Figures 3 and 4, in which $b^0$ are concave sockets surrounding the bolt holes $b^2$ in the web plates B. These bolt holes should be appreciably larger than the bolts so that the bolts may enter freely, and so that the disks may be readily and quickly removed, and so that play of the wheel on the hub is permitted. Moreover, there should be a sufficient clearance in the perforation in the center of the web plate so that the web plate may slip freely over the axle.

The opposite ends of the bolts D are screw-threaded in reverse directions to engage the nut F for attaching the bolt to the collar of the hub, and the nut G for attaching the bolt to the removable portion of the wheel.

The bolt D may be provided with an annular flange $d^2$ to engage in a corresponding socket $a^2$ in the collar A', and it is also provided with a convex boss $d^0$ to engage in the concave socket of the adjacent web plate.

The nut G has a convex boss $g$ to engage in the corresponding concave socket in the adjacent web plate. It will be noted that when the nuts F and G are set up tight, the web plate or plates will be firmly held in position and will bear on the convex bosses $d^0$ and $g$, and thus the web plate or plates will be held clear of the hub and will be firmly attached to the hub collar, and any angular motion of the web plate, relative to the hub of the wheel, will be prevented by means of the bolts D. There will also be a clearance between the web plates and the screw-threaded portions of the fastening bolts, so there will be no wear on these screw-threaded portions, and at the same time the web plates may be quickly removed when the nuts G are removed.

It will be noted that, as stated above, the central opening in the web plate B is larger than the corresponding portion $a$ of the hub so that there is a considerable clearance at this point. The perforations or bolt holes $b^2$ are also larger than the screw-threaded portions of the bolts D and there is a clearance at those points also. It follows from this that, when the web plate is assembled, it is supported by the engagement of the nuts G in the depressions or sockets and not by any engagement of the web plate with the body portions of the bolts D or the hub A. I have found that, when the above conditions are present and the hand of the threads for the nuts G is the same as the direction of forward rotation of the wheel, that is to say, the nuts, G, to tighten, must be turned in the same direction as the forward rotation of the wheel, then the forward rotation of the wheel sets up forces which automatically tighten the nuts G and tend to maintain them tightened. Expressed in other terms, if the right-hand wheels have right-hand threads and left-hand wheels left-hand threads, for the nuts G, then the forward motion of the vehicle will cause the nuts G to tighten. Of course, the backward rotation of the wheels, as in backing the vehicle, would set up forces acting in the opposite direction and tending to loosen nuts G, but the periods during which the wheels of a vehicle are turning backward, in ordinary operation, are so short, as compared with the periods of forward rotation, that such loosening action is negligible. I believe this tightening action is due to the fact that the clearance between the hub and the wedge of the central opening in the plate and between the bolts and the edges of the bolt holes permits, when the nuts loosen, a limited eccentric gyration of the plate relative to the hub, which causes portions of the plate intermittently to bear on and move relative to the nuts in the same direction as the direction of rotation of the wheel. This action is believed to set up forces acting on the nuts to tighten them. It will be observed that this is quite different from the tightening of the ordinary axle nut, in which case the nut is screwed on the fixed axle spindle and tightened due to the continuous frictional engagement between the nut and the revolving wheel.

Among the advantages of the construction herein described are the greater strength and durability over the wheels with wooden spokes, generally in use at the date of my invention, and the fact that metal wheels are not likely to be affected by climatic conditions, such as continued use alternately on muddy roads, or in dry weather.

Moreover, by giving the wheels the dished shape, a certain amount of resiliency is imparted to the wheel which is not possessed by metal wheels having the webs at right angles to the axis of the hub. Furthermore, by having the thickness of the web plate tapering from the hub outwards, this resiliency is increased, and at the same time the gyroscopic effect of heavy rotating masses carried by the periphery of the wheel is in a measure obviated. By having the elements of the cone curved, as shown, instead of straight, greater strength for the same weight of metal is secured near the periphery of the wheel.

It will be noted that the metal wheel is of great simplicity, and can be readily adapted to all types of hub, its application not requiring any changes in the construction of the hub except attaching to the hub a collar or coupling plate of suitable size to receive the fastening bolts.

These and various other advantages of the herein described construction will suggest themselves to those skilled in the art.

It will be obvious that various modifications might be made in the herein described construction, and in the operation of the same which could be used without departing from the spirit of my invention; and I do not mean to limit the invention to such details except as particularly pointed out in the claims.

Having thus described my invention what I claim and desire to secure by Letters Patent of the United States is:—

1. A vehicle wheel comprising a hub, and an annular dished web plate provided with a flanged periphery, and with a central annular reinforce adapted to play freely over said hub, said web plate being substantially in the form of a hollow truncated cone from its center to its periphery, and having the elements of said cone concaved from the apex toward said periphery, a rim secured on said flanged periphery, and means for detachably connecting the reinforced central portion of said web plate to said hub.

2. A vehicle wheel comprising a hub, and an annular dished web plate provided with a flanged periphery, and with a central annular reinforce adapted to play freely over said hub, said web plate being substantially in the form of a hollow truncated cone from its center to its periphery, and having the elements of said cone concaved from the apex toward said periphery, said web plate being also of decreasing thickness from its reinforced central portion to its periphery, a rim secured on said flanged periphery, and means for detachably connecting the reinforced central portion of said web plate to said hub.

3. A vehicle wheel comprising a hub having an annular collar thereon, with bolt holes in said collar, an annular dished web plate provided with a flanged periphery, and with a central annular reinforce adapted to play freely over said hub, said reinforced portion being provided with bolt holes registering with the bolt holes on said collar and with concave sockets surrounding one end of said bolt holes, a rim secured on said flanged periphery, and means for detachably connecting the reinforced central portion of said web plate to said hub, comprising bolts passing freely through said bolt holes, nuts securing one end of said bolts to said collar, and nuts having convex bosses engaging in said concave sockets mounted on the other end of said bolts.

4. A vehicle wheel comprising a hub having an annular collar thereon, with bolt holes in said collar, an annular dished web plate provided with a flanged periphery, and with a central annular reinforce adapted to play freely over said hub, said reinforced portion being provided with bolt holes registering with the bolt holes on said collar and with concave sockets surrounding one end of said bolt holes, said web plate being of decreasing thickness from its reinforced central portion to its periphery, a rim secured on said flanged periphery, and means for detachably connecting the reinforced central portion of said web plate to said hub, comprising bolts passing freely through said bolt holes, nuts securing one end of said bolts to said collar, and nuts having convex bosses engaging in said concave sockets mounted on the other end of said bolts.

5. A vehicle wheel comprising a hub having an annular collar thereon, with bolt holes in said collar, an annular dished web plate provided with a flanged periphery, and with a central annular reinforce adapted to slip freely over said hub, said reinforced portion being provided with bolt holes registering with the bolt holes on said collar and with concave sockets surrounding one end of said bolt holes, a rim secured on said flanged periphery, and means for detachably connecting the reinforced central portion of said web plate to said hub, comprising bolts passing freely through said bolt holes, said bolts having oppositely disposed screw threads on the opposite ends thereof, nuts securing one end of said bolts to said collar, and nuts having convex bosses engaging in said concave sockets mounted on the other end of said bolts.

6. A vehicle wheel comprising a hub having an annular collar thereon, with bolt holes in said collar, an annular dished web plate provided with a flanged periphery, and with a central annular reinforce adapted to slip freely over said hub, said reinforced portion being provided with bolt holes registering with the bolt holes on said collar and with concave sockets surrounding one end of said bolt holes, said web plate being of decreasing thickness from its reinforced central portion to its periphery, a rim secured on said flanged periphery, and means for detachably connecting the reinforced central portion of said web plate to said hub, comprising bolts passing freely through said bolt holes, said bolts having oppositely disposed screw threads on the opposite ends thereof, nuts securing one end of said bolts to said collar, and nuts having convex bosses engaging in said concave sockets mounted on the other end of said bolts.

7. A vehicle wheel comprising a hub having an annular collar thereon, with bolt holes in said collar, an annular dished web plate provided with a flanged periphery, and with a central annular reinforce adapted to slip freely over said hub, said reinforced portion being provided with bolt holes registering with the bolt holes on said collar and with concave sockets surrounding one end of said bolt holes, a rim secured on said flanged periphery, and means for detachably connecting the reinforced central portion of said web plate to said hub, comprising bolts passing freely through said bolt holes, said bolts having oppositely disposed screw threads on the opposite ends thereof, and said screw threads being so arranged that the nuts of the right wheels shall have right-hand threads, and the nuts of the left wheels shall have left-hand threads, nuts securing one end of said bolts to said collar, and nuts having convex bosses engaging in said concave sockets mounted on the other end of said bolts.

8. A vehicle wheel comprising a hub having an annular collar thereon with bolt holes in said collar, an annular dished web plate provided with a flanged periphery, and with a central annular reinforce adapted to slip freely over said hub, said reinforced portion being provided with bolt holes registering with the bolt holes on said collar and with concave sockets surrounding one end of said bolts holes, said web plate being of decreasing thickness from its reinforced central portion to its periphery, a rim secured on said flanged periphery, and means for detachably connecting the reinforced central portion of said web plate to said hub, comprising bolts passing freely through said bolt holes, said bolts having oppositely disposed screw threads on the opposite ends thereof, and said screw threads being so arranged that the nuts of the right wheels shall have right-hand threads, and the nuts of the left wheels shall have left hand threads, nuts securing one end of said bolts to said collar, and nuts having convex bosses engaging in said concave sockets mounted on the other end of said bolts.

9. A vehicle wheel comprising a hub having an annular flange, a plurality of bolts carried thereby, said bolts being provided with screw-threads of the same hand as the wheel, a web plate having a central opening through which said hub extends and a plurality of bolt holes through which said bolts extend, there being clearances between said hub and said central opening and between said bolts and the edges of said bolt holes and nuts screwed on the screw-threads of said bolts and engaging said web plate, whereby forces are set up during the forward rotation of the wheel to automatically tighten the nuts.

10. A vehicle wheel comprising a hub having an annular flange, a plurality of bolts carried thereby, said bolts being provided with screw-threads of the same hand as the wheel, a web plate having a central opening through which said hub extends and a plurality of bolt holes, positioned at equal distances from the center of said plate, through which said bolts extend, there being clearances between said hub and the edge of said central opening and between said bolts and the edges of said bolt holes and nuts screwed on the screw threads of said bolts and having a supporting engagement with said web plate, whereby forces are set up during the forward rotation of the wheel to automatically tighten the nuts.

11. A vehicle wheel comprising a hub having an annular flange, a plurality of bolts carried thereby, said bolts being provided with screw-threads having the same hand as the wheel, a web plate having a central opening through which said hub extends and a plurality of centrally perforated concave sockets through which said bolts extend, there being clearance between the edge of said opening and said hub and between the edges of the perforations of said sockets and said bolts, and nuts screwed on the screw threads of said bolts and having convex bosses engaging in said concave sockets, whereby forces are set up during the forward rotation of the wheel to automatically tighten the nuts.

12. In a wheel of the type described, the combination with a hub having a plurality of laterally-extending studs, of a body mounted on said hub and a tire rim mounted on said body, and nuts on said studs engaging the body, said nuts being so formed and co-operating with the body so that they are held fast by the driving torque for holding said body tight on said hub and thereby causing said body and rim to run true and silently under varying driving stresses.

13. In a vehicle wheel the combination of annularly related wheel parts connected together in the plane of the wheel and an annular series of threaded fastening devices, having a threaded engagement with one of said parts and a non-threaded engagement with the other of said parts, which non-threaded engagement is by surface so formed and so cooperating that the fastening devices are held fast by the driving torque, for holding said annular parts together, thereby causing said parts to run true and silently under varying stresses.

14. In vehicle wheels, the combination of annularly related wheel parts connected together substantially in the plane of the wheel, and an annular series of threaded fastening devices so connecting them, which devices each have a threaded engagement with one of said wheel parts of opposite hands for right and left wheels respectively and a re-entrant face engagement with the other wheel part.

15. In vehicle wheels, the combination of annularly related wheel parts fitted to slip freely one over the other and mounted substantially in the plane of the wheel, and an annular series of threaded fastening devices holding them in position, which devices each have a threaded connection with one of said wheel parts free of the other and are of opposite thread hands for right and left wheels respectively, and a re-entrant face engagement with the other wheel part.

16. In a vehicle wheel the combination of annularly related wheel body parts connected together substantially in the plane of the wheel, and an annular series of axially extending complementally tapered sockets and bosses constituting substantially the sole torque driving connection between the parts, and having axially extending means clamping the bosses in the sockets and by the same action the wheel body parts together.

17. In a vehicle wheel the combination of annularly related wheel body parts connected together substantially in the plane of the wheel and adapted to permit relative play, and an annular series of axially extending complementally tapered sockets and bosses constituting substantially the sole torque driving connection between the parts, and having fastening devices connecting the parts on the axes of the driving connections and also adapted to permit relative play, and which devices themselves carry a portion of the driving connection.

18. A vehicle wheel comprising a hub having an annular flange, a plurality of bolts carried thereby, said bolts being provided with right hand screw threads for the right side of the vehicle, a wheel body having a central opening through which said hub extends, and a plurality of centrally perforated concave sockets through which said bolts extend, there being clearances between the edge of said opening and said hub, and between the edges of the perforations of said sockets and said bolts, and nuts screwed on the screw threads of said bolts and having convex bosses engaging in said concave sockets, whereby forces are set up during the forward rotation of the wheel to automatically tighten the nuts.

19. A vehicle wheel comprising a hub having an annular flange, a plurality of bolts carried thereby, said bolts being provided with left hand screw threads for the left side of the vehicle, a wheel body having a central opening through which said hub extends, and a plurality of centrally perforated concave sockets trough which said bolts extend, there being clearances between the edge of said opening and said hub, and between the edges of the perforations of said sockets and said bolts, and nuts screwed on the screw threads of said bolts and having convex bosses engaging in said concave sockets, whereby forces are set up during the forward rotation of the wheel to automatically tighten the nuts.

20. In vehicle wheels, the combination of annularly related wheel parts connected together substantially in the plane of the wheel, and an annular series of threaded fastening devices so connecting them, which devices each have a threaded engagement with one of said wheel parts of opposite hands for right and left wheels respectively.

21. In vehicle wheels, the combination of annularly related wheel parts fitted to play freely one over the other and mounted substantially in the plane of the wheel, and an annular series of threaded fastening devices holding them in position, which devices each have a threaded connection with one of said wheel parts, have free play with respect to the other wheel part and are of opposite thread hands for right and left wheels respectively.

In testimony whereof, I affix my signature.

ANDRÉ JULES MICHELIN,